United States Patent [19]

Ohkawa

[11] 4,087,873

[45] May 9, 1978

[54] APPARATUS FOR MOVING OBJECTS

[76] Inventor: Hiroshi Ohkawa, 3-13-8 Minamigaoka, Nishin-cho, Aichi-gun, Aichi-ken 470-01, Japan

[21] Appl. No.: 753,636

[22] Filed: Dec. 23, 1976

[30] Foreign Application Priority Data

Dec. 27, 1975 Japan .................................. 50-158315

[51] Int. Cl.[2] ............................ A61G 7/08; F16H 7/18

[52] U.S. Cl. ............................................ 5/81 B; 5/86

[58] Field of Search .......................... 5/81 R, 84 C, 86; 269/322-325; 250/439; 198/202

[56] References Cited

U.S. PATENT DOCUMENTS

| | | | |
|---|---|---|---|
| 3,493,979 | 2/1970 | Koll et al. | 5/81 C |
| 3,654,644 | 4/1972 | Stevens | 5/81 C |
| 3,724,005 | 4/1973 | Stevens | 5/81 C |
| 3,871,036 | 3/1975 | Attenburrow | 5/81 C |

*Primary Examiner*—Casmir A. Nunberg

*Attorney, Agent, or Firm*—Berman, Aisenberg & Platt

[57] ABSTRACT

A variety of objects, including an invalid or a non-ambulatory hospital patient may be moved from one location to another. The transfer device includes a conveyer belt, a frame for supporting said conveyer belt, a base for holding said frame, driving means for translating said frame relative to said base, and connecting means for connecting or releasing a part of the upper portion of said conveyer belt with said base. When the connecting means connects a part of the upper portion of said conveyer belt with the base, the conveyer belt is not only carried with the frame, but also is rotated around the frame by driving the frame relative to the base. On the other hand, when the connecting means releases the belt from the base, the conveyer belt is also carried with the frame but is not rotated around the frame by driving the frame relative to the base. A patient is moved by placing the device adjacent to him. At first the connecting means is operated to connect a part of the upper portion of the conveyer belt and the base, and then the frame is driven toward the patient. When the frame together with the conveyer belt contact with the body of the patient, the leading edge of the conveyer belt which is rotating in an upwardly-oriented direction, gently and uniformly lifts the patient up onto the frame. Then, the connecting means is operated to release the conveyer belt and the base, and the frame is driven reversely. The patient on the frame is carried with the frame to just above the base. The transfer device may include the second belt which is placed just below the first conveyer belt and is fixed always to the base. Further the transfer device may form an integral part of an apparatus such as a wheeled stretcher, or it may be used independently. Upon arrival the patient is off loaded by operating the transfer device adversely.

8 Claims, 8 Drawing Figures

APPARATUS FOR MOVING OBJECTS

BACKGROUND AND BRIEF DESCRIPTION OF THE INVENTION

This invention relates to an apparatus for moving objects to a desired location, especially for transferring non-ambulatory patient on a bed or on an operating table.

Prior to this invention, the transfer of non-ambulatory patients to various locations in a hospital presented a formidable problem. Previous methods of transferring a patient from a bed to a wheeled-stretcher have required manual effort of two or three workers each posed in the shape of an inverted letter L. Therefore, the workers suffer cricks in their back. In order to do without the workers, it is necessary to mechanize said manual effort.

The present invention embodies an apparatus which effectively carries out said works mechanically. The apparatus for moving objects of the present invention contains conveyor belt means for carrying an object, frame means for supporting said conveyer belt means rotatably, base means for holding said frame means, driving means for translating said frame means relative to said base means in parallel with the rotating direction of said conveyor belt means, and connecting means for connecting a part of the upper portion of said conveyor belt means with said base means or for releasing the connection between said part and said base. When the connecting means connects a part of the upper portion of the conveyer belt means with the base means and the driving means drives the frame means forwardly or backwardly relative to the base means, the conveyer belt means is not only carried with the frame means but also is rotated around the frame means. However, the upper portion of the conveyer belt means is not moved relative to the base means. In this case, the apparatus can lift a patient on a bed upto the frame means or can let the patient on the frame means unload on the bed without moving the patient in any horizontal direction. Namely, the frame means together with conveyor belt means enters between the patient and the bed or leaves between them. On the other hand, when the connecting means releases the connection mentioned above and the driving means drives the frame means relative to the base means, the conveyer belt means is just carried with the frame means without rotating around the frame means. Of course, the upper portion of the conveyer belt means is moved together with the frame means relative to the base means. In this case, the apparatus can move a patient on the frame means forwardly or backwardly in a horizontal direction. Namely, the apparatus can move a patient from a bed to the base means placed adjacent to the bed. The patient held above the base means can be carried to any location with the apparatus. Thus, the apparatus serves as a substitute for the workers.

Moreover, the apparatus may include a second belt means which is placed just below the conveyer belt means and is fixed to the base means. The second belt means eliminates the troubles that would be caused by the contact of the conveyer belt means and the surface of a bed. Further, the apparatus may form an integral part of a machinery such as a wheeled-stretcher, or it may be used independently.

It is also apparent that the apparatus of the present invention may be used to move heavy objects. The dimensions of the apparatus could be varied if desired, and the structure could be strengthened if necessary to support extremely heavy objects.

DESCRIPTION OF THE DRAWINGS

In addition to the aforementioned features, other advantages of the invention will become apparent in the more detailed description of the invention which follows; reference will be made to the accompanying drawings in which.

DETAILED DESCRIPTION OF THE INVENTION

Figure 1A:
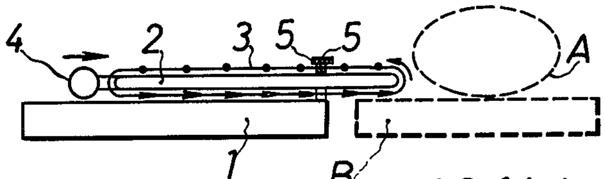
FIGS. 1(*a*)–1(*d*) are schematic views illustrating the basic functions of a generalized model of the present invention.
Figure 1B:
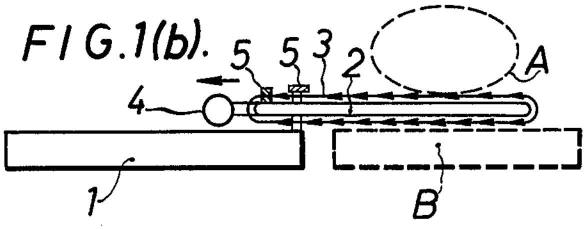
Figure 1C:
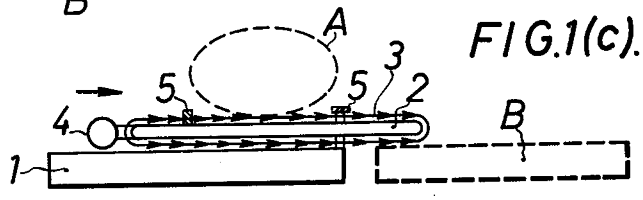
Figure 1D:
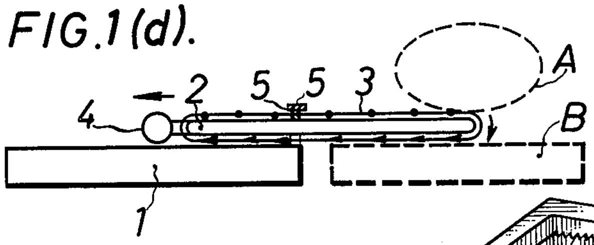

In order to explain the structure and mode of operation of the invention, a generalized model of the invention is shown in the four FIG. 1 sketches. In FIG. 1, the numeral 1 indicates base means, 2 indicates frame means, 3 indicates conveyer belt means, 4 indicates driving means, 5 indicates connecting means, the letter A indicates an object to be moved, and the letter B indicates a supporter to support the object A. Also the directions of arrows indicate the moving directions of each part of the conveyer belt means 3 relative to the base means 1. The dots in FIG. 1(*a*) and 1(*d*) indicate that the dotted parts of the conveyer belt means 3 are not moved relative to the base means 1. FIG. 1(*a*) shows the first stage of the model in which a part of the upper portion of the conveyer belt means 3 is fixed to the base means 1 by the connecting means 5, and the frame means 2 is translated to the right by driving the driving means 4 to this right. In the stage, the conveyer belt means 3 is not only translated to the right with the frame means 2 but also is rotated around the frame means 2. Namely, the upper portion of the conveyer belt means 3 is not moved relative to the base means 1 because a part of the upper portion of the conveyer belt means 3 is fixed to the base means 1. And, the lower portion of the conveyer belt means 3 is moved to the right at the speed of two times faster than that of the frame means 2. The right end portion of the conveyer belt means 3 is moved upwardly and the left end portion of the conveyer belt 3 is moved downwardly. As exactly shown in FIG. 1(*a*), when the right end portion of the conveyer belt means 3 enter between the object A and the supporter B, the object A is lifted upwardly by the right end portion of the conveyer belt means 3 and then placed on the upper portion of the conveyer belt means 3 since the frame means 2 is moved to the right at the time. In this stage, the speed of the upper portion of the conveyer belt means 3 relative to the base means 1 is zero. Therefore there is not relative motion between the upper portion of the conveyer belt means 3 and the object A. This means that no sliding occurs between them. In other words, the object A is forced just upwardly, but not moved to the right and both of the frame means 2 and conveyer belt means 3 can enter between the object A and supporter B.

FIG. 1(*b*) shows the second state of the model in which the connecting means 5 is open and the frame means 2 is translated to the left by driving the driving means to the left. In this stage, since the conveyer belt means 3 is completely free from the base means 1, the conveyer belt means is moved to the left together with the frame means 2 without rotating around the frame means 2. No force except from the frame means 2 is applied to the conveyer belt means 3 so that there is no relative motion between the conveyer belt means 3 and the frame means 2. Therefore, the object A placed on the conveyer belt means 3 is translated to the left together with the conveyer belt means 3.

FIG. 1(*c*) shows the third stage of the model in which the connecting means 5 is open and the frame means 2 is translated to the right. The third stage of the model is just the inverse of the second stage of the model. In the third stage the object A is translated to the right together with the conveyer belt means 3.

FIG. 1(*d*) shows the fourth stage of the model in which a part of the upper portion of the conveyer belt means 3 is fixed to the base means 1 and the frame means 2 is translated to the left. The fourth stage of the model is just the inverse of the first stage of the model. In this stage the conveyer belt means 3 is rotated clockwise around the frame means 2. Since the upper portion of the conveyer belt means 3 is not moved but is fixed relative to the base means and the lower portion of the conveyer belt means is sent to the left by the frame means 2, the conveyer belt means 3 and frame means 2 leave the object A. The object A is naturally placed on the supporter B.

As illustrated with the generalized model, the apparatus of the present invention is intended to move an object from one location to another through said four stages. One of the merits of the invention is that it is simple to operate the apparatus. The apparatus requires only to connect or disconnect the connecting means 5 and to drive the driving means 4 forwardly or backwardly. The other merit of the invention is that the apparatus necessitates only one driving means not to drive the conveyer belt means 3 but to drive the frame means 2. As well known, it is very difficult to drive a conveyer belt because of the slip of the conveyer belt. The apparatus of the present invention overcomes this difficulty by driving the frame means 2 and fixing a part of the upper portion of the conveyer belt means 3 to the base means 1.

Hereinafter, a few embodiments of the present invention will be given and the invention will be described in more detail.

Figure 2:
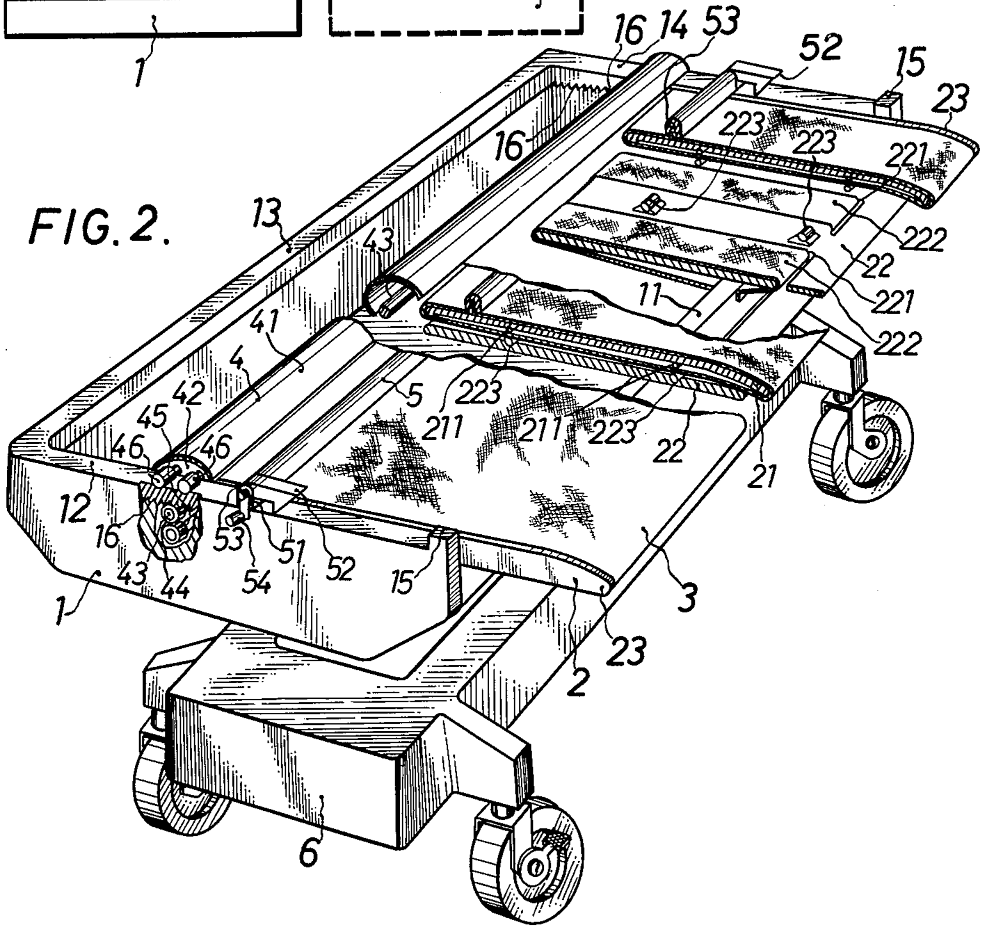
FIG. 2 is a partially broken perspective view of a first embodiment in the half extended position with the device shown as an integral part of a wheeled-stretcher.

The first embodiment is shown in FIG. 2. This embodiment is based on the generalized model shown in FIG. 1 and is formed as an integral part of a wheeled-stretcher for moving a patient. In FIG. 2, parts or portions of the stretcher are indicated with the same numerals as those of the same or similar parts or portions of the model shown in FIG. 1.

The stretcher comprises a well-known flat car 6, a well-known lift shaft (not shown) fixed on said flat car 6 and an apparatus for moving objects placed on said flat car 6 through said lift shaft. The apparatus for moving objects comprises a base 1 which is a shallow rectangular box with an opening on its top, a frame 2, which is a rectangular board, supported on said base 1, a conveyer belt 3 rotatably supported on said frame 2, driving means 4 supported on said base 1 for translate said frame 2 parallel to the short sides of said rectangular box-like base 1, and a rod like connecting means 5 fixed across on said conveyer belt 3.

The base 1 has a horizontal bottom wall and four vertical wall plates, the first or sidewall plate 11, the second or end plate 12, the third or side plate 13 and the fourth or end plate 14. The four plates are arranged to form a rectanular box-like body open at the top. The first plate 11 corresponds in length to that of the base 1, and the frame 2 slides on the plate 11 when it moves in or out of the base 1. The height of the first plate 11 is less than that of the other plate 12 to 14 by the thickness of the frame 2. The third plate 13 faces the first plate 11 and corresponds to the other long side of the base 1. The second plate 12 and the fourth plate 14 face each other and correspond to the short sides of the base 1.

Two upward projections 15 to be linked with the connecting means 5 are formed at the end portion of each of the second plate 12 and the fourth plate 14, and beside the first plate 11. The top surfaces of the second plate 12 and the fourth plate 14 are smooth and the under surfaces of the plates 12 and 14 are provided with teeth 16. The base 1 is primarily made from stainless steel and aluminum.

The frame 2 comprises an upper, horizontal slide plate 21 and a lower, horizontal slide plate 22, which are like rectangular boards and are disposed one over the other with a certain space between them. Two side plates 23 fix the two slide plates 21 and 22 at the both short or end sides thereof. The lower slide plate 22 is provided with a line of openings 221 at the end portion of one of the long side thereof and parallel to the long side. Each of fixed belts 222 pass through one of the openings 221 and goes over the other side of the slide plate 22. The one end of each fixed belt 222 is fixed on the outer side portion of the first plate 11 of the base 1 and the other end of each fixed belt 222 is fixed on the inner side portion of the first plate 11 by suitable fasteners (not shown in Figures). Fastening the ends of the belt 222 causes the belt to roll with respect to plate 22 when the latter moves. Further several guide rollers 223 are provided on the upper surface of the lower slide plate 22. Also other guide rollers 211 are provided on the lower surface of the upper slide plate 21. Each of the guide rollers 223 of the lower slide plate 22 faces to one of the guide rollers 211 of the upper slide plate 21.

The frame 2 is placed on the base 1 and is guided by the inner side surfaces of the second plate 12 and the fourth plate 14 of the base 1. The upper slide plate 21 is made of polyethylene but can be made of another plastic or metal. The lower slide plate 22 is made of a metal plate with smooth surfaces. The metal plate should be treated to lower the frictional coefficient thereof.

A conveyer belt 3 is wound on the upper slide plate 21 and envelops almost all the surfaces of the upper slide plate 21. Namely, the under portion of the conveyer belt 3 is held between the guide roller 211 of the upper slide plate 21 and guide roller 223 of the lower slide plate 22. The both ends of the upper portion of the conveyer belt 3 are bound by the connecting means 5 to form a continuous loop of the conveyer belt 3.

The driving means 4 has a case which is composed of a cover 41 having a shape of a conduit and two supporting board 42 fixed on the end portions of the cover 41. Each of the supporting boards 42 is fixed on each of the side boards 23 of the frame 2. A driving shaft 43 passes through the both supporting boards 42 and a driving gear 44 is fixed on each end of the driving shaft 43. Each of the driving gears 44 meshes with the teeth 16 of the base 1. One of the driving gear 44 is in gear with an input gear 45 at the other side of the teeth 16. The input gear 45 is connected with a driving motor (not shown in Figures) fixed on one of the supporting boards 42. Also, each of the supporting boards 42 has two guide rollers 46 at the under portion thereof. These guide rollers 46 are in contact with the upper surfaces of the second plate 12 and the fourth plate 14.

The connecting means 5, which secures the both ends of the conveyer belt 3, is a tube which lies across the conveyer belt 3 and the both end portions 51 of the connecting means 5 stick out past the both sides of the conveyer belt 3. Each of the end portions 51 is in contact with each of the upper surfaces of the second plate 12 and the fourth plate 14 of the base 1. Also each of the end portions 51 has the hook 52 having a shape of letter J. The two hooks are fixed on a rod shaft 53 which has a handle 54 at one end thereof. Therefore, the two hooks 52 are rotated at the same time by rotating the handle 54. Each of the hooks 52 is engageable with one of the projections 15 of the base 1. The stretcher, or transfer device has the construction mentioned above.

Next, the functions and effects of the stretcher will be explained. The first step is to connect the hooks 52 of the connecting means 5 with the projections 15 of the base 1 and to install the frame 2 into the base 1. In order to set the stretcher in the state mentioned above from the state shown in FIG. 2, it is necessary to drive the motor for translating the frame 2 to the right and then to connect the hooks 52 of the connecting means 5 with the projections 15 of the base 1. Next, it is necessary to drive the motor reversely for translating the frame 2 to the left. It may here be remarked incidentally that the relative motions of the upper slide plate 21 and the conveyer belt 3 are the same as explained with regard to FIG. 1 (*a*)–1(*d*). Namely, when the hooks 52 of the connecting means 5 is connected with the projections 15, the translation of the frame 2 results in rotating the conveyer belt 3 around the frame 2. In this case, the relative motion of the upper portion of the conveyer belt 3 to the base 1 is zero. On the other hand, when the hooks 52 are not connected with the projections 15, the conveyer belt 3 is not rotated around the frame 2 by the translation of the frame 2. The conveyer belt 3 is translated together with the frame 2 to the left or to the right. The relation between the lower slide plate 22 of the flame 2 and the fixed belt 222 is the same as the state where the conveyer belt 3 is connected with the base 1 by the connecting means 5. Namely, since the fixed belt 222 is always connected to the first plate 11 of the base 1, the fixed belt 222 rotates around the lower slide plate 22 whenever the frame 2 is translated. Further, as the fixed belt 222 is fixed to the first plate 11 under the lower slide plate 22, the relative speed between the under portion of the fixed belts 222 and the base 1 is zero in the normal condition. The two kinds of guide rollers provided respectively on the lower side of the upper slide plate 21 and on the upper side of the lower slide plate 22 work not only to prevent the conveyer belt 3 from contacting with the fixed belt 222 but also to convey the load applyed on the upper slide plate 21 to the lower slide plate 22. The moving direction of the lower portion of the conveyer belt 3 is perpendicular to the applying direction of the load and the guide rollers will be rotated by very small force. Therefore, the resistance which is applied to the belt 3 by the load applied to the upper slide plate 21 does not increase very much. The stretcher which is in the state mentioned above is moved close to the bed on which a patient lies. Then, the height of the apparatus for moving objects is adjusted according to that of the bed so that the lower surface of the lower slide plate 22 of the frame 2 may become equal in height to the top surface of the bed. Then, after the connection of the hooks 52 of the connecting means 5 and the projections 15 of the base 1, the driving means 4 is driven to pull the frame 2 out of the base 1 onto the bed. The positioning of the outermost end portion of the lower slide plate 22 of the frame 2 prevents the lower portion of the conveyer belt 3 from contacting with the surface of the bed. Also since the lower portion of the fixed belt 222 of the lower slide plate 22 does not move relatively to the surface of the bed, the fixed belt 222 works to push down the bed. Especially, the fixed belt 222 is helpful where the bed is covered with a sheet. However, the lower slide plate 22 and the fixed belt 222 do not act directly on the patient. Even if the lower slide plate 22 and the fixed belt 222 are removed from the frame and parts 2, the remaining frame can move a patient without special difficulties or pain given to the patient, but may cause damage to the upper surface of the bed or tuck up the sheet on the bed.

According to the advance of the frame 2, the edge of the frame 2 enters between the patient and the bed and the patient is lifted slightly and ridden on the conveyer belt 3. When the patient is placed on the middle of the upper portion of the conveyer belt 3, the driving means 4 is stopped. Then, the hooks 52 of the connecting means 5 are released from the projections 15 of the base 1 and the driving means 4 is driven reversely to translate the frame 2 carrying the patient into the base 1. In this case, no outer force is applied to the conveyer belt 3 except the force applied by the upper slide plate 21, therefore the conveyer belt 3 does not rotate around the upper slide plate 21 of the frame 2 and the patient remains placed on the middle of the upper portion of the conveyer belt 3.

In this state, the patient can be carried to any place, for example, to an operating room and moved onto an operating table by the stretcher. The steps for moving the patient from the stretcher to the operating table are just the reverse of the steps for moving the patient from the bed to the stretcher. Also the steps are the same as the steps explained with regard to FIG. 1(*c*) and FIG. 1(*d*). Therefore, further explanation of the steps of the present case will be omitted.

Figure 3:
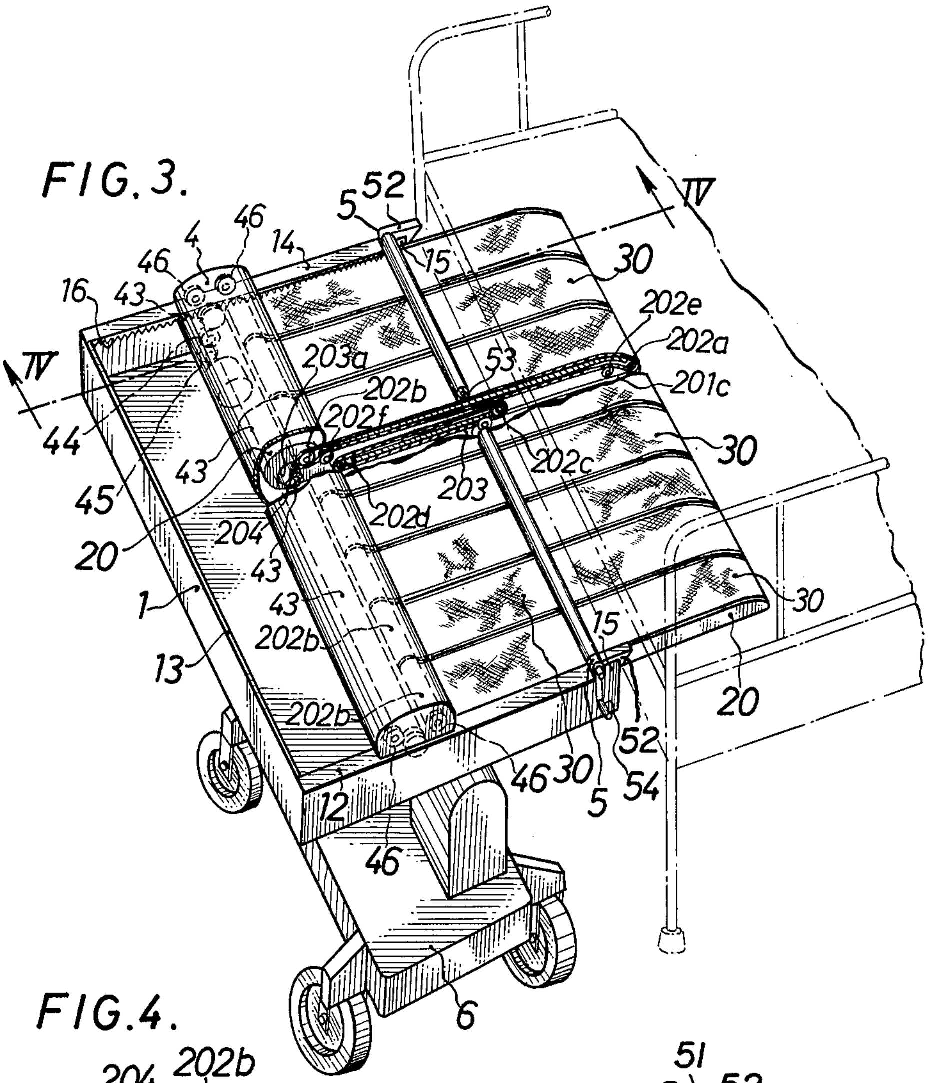
FIG. 3 is a partially broken perspective view of a second embodiment also as part of a wheeled stretcher.
Figure 4:
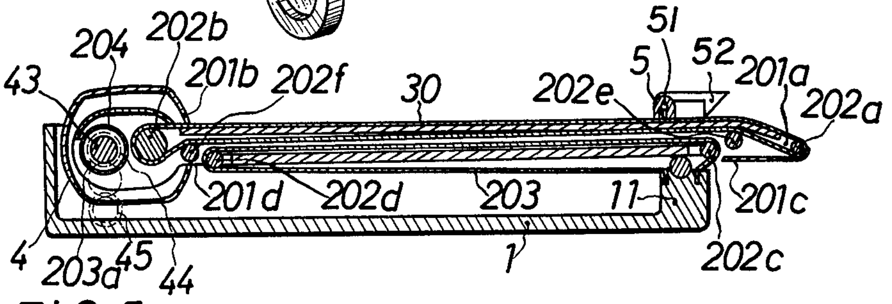
FIG. 4 is a cross sectional view of the transfer device only of FIG. 3.
Figure 5:
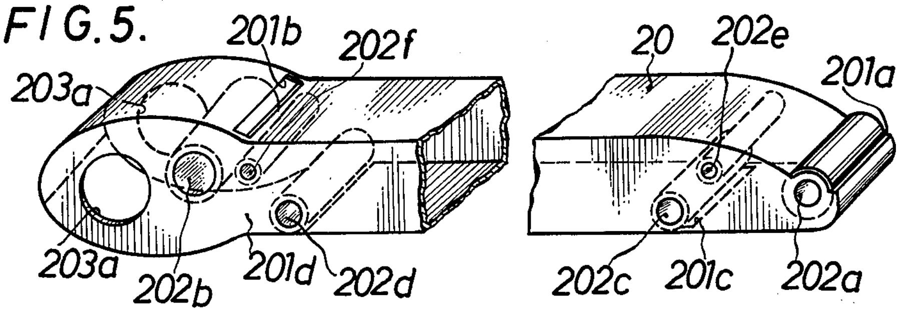
FIG. 5 is a partially broken perspective view of a frame element of the transfer device.

Next, the second embodiment of the apparatus for moving objects, which has multiple frames and multiple conveyer belt 3, will be explained. The apparatus is shown in FIG. 3 and FIG. 4, and is different from the first embodiment in frames and conveyer belts. Namely, the base, the driving means and the connecting means of the second embodiment are the same as those of the first embodiment. Here, the frame (a perspective view thereof is shown in FIG. 5) and the conveyer belts of the second embodiment will be mainly explained. In FIG. 3 and FIG. 5, same parts or portions of the second embodiment as those of the first embodiment are marked with the same numerals as those of the first embodiment shown in FIG. 2. The apparatus for moving objects is characterized by that eight frames 20, each of which has a rectangular box like shape and is provided with one conveyer belt 30, are arranged parallel to each other and are pivoted with one shaft at one of the end portions thereof. The frame 20, which is shown in FIG. 5, is like a slender vacant box, and the leading end is thinner, or of less height than the trailing end, and has an opening 201*a* which opens upwardly. Another rectangular opening 201*b*, which opens upwardly, is provided near the trailing end portion of the frame 20. Further opening 201*c*, which opens downwardly, is provided near said leading portion and another broad opening 201*d*, which opens downwardly, is provided near said trailing end portion. At each of the openings 201*a* to 201*d* is pivotedly provided one of four rollers 202*a* to 202*d*. Further, additional two rollers 202*e* and 202*f* are provided between the two rollers 202*a* and 202*b*. The conveyer belt 30 comes in the opening 201*a*, turns around the outer side of the roller 202*a*, goes over the rollers 202*e*, 202*f*, turns around the outer side of the roller 202*b* and comes out of the opening 201*b*. The both ends of the conveyer belt 30 are fixed together with the connecting means 5 over the upper side of the frame 20. A fixed belt 203 comes in the opening 201*c*, turns around the outer sides of the rollers 202*c* and 202*d*, and comes out of the opening 201*d*. The both ends of the fixed belt 203 are fixed to the first plate 11 of the base 1. At the trailing end of the frame 20 is provided a through hole 203*a* through which a shaft 204 made of a pipe passes. The shaft 204 passes through the through holes 203*a* of the eight frames 20 and arranges the eight frames 20 in parallel with each other. The eight frames 20 are driven through the shaft 204 by the driving means 4. In this embodiment, a driving shaft 43 is rotatably provided within the pipe like shaft 204. The driving force is transmitted from the driving means 4 to the frame 20 through the driving shaft 43 and the pipe like shaft 204. All the eight conveyer belts 30 are fixed to a pole like member 51 of the connecting means 5.

The apparatus of the second embodiment having the construction mentioned above not only operate in the same manner as the apparatus of the first embodiment but also changes the leading edge line of the frames 20 according to the shape of a patient to be moved. Namely, as each of the frames 20 can be rotated around the shaft 204 with respect to the other frames 20, the edge portion of each of the frames 20 moves upwardly or downwardly. Therefore, the edge line formed of the end portions of the frames 20 is changed in parts upwardly or downwardly by the shape of the patient and the frames are able to move between the patient and the bed. Also, the driving force for driving the frames 20 can be substantially decreased.

Each of the apparatuses embodied above is applied to a wheeled stretcher. However, the apparatuses can be applied to a litter or a non-wheeled stretcher or to some other machinery such as hospital equipments. Further in the embodiments, the driving means 4 includes a motor, but the driving means 4 can be driven by man power.

What is claimed is:

1. An apparatus for moving an object, comprising:
   an endless conveyor belt for carrying an object and rotatably mounted about a generally flat, substantially horizontal support plate;
   a base under said plate supporting the plate for horizontal rectilinear movements away from the base and return to initial overlying position;
   driving means connected to said plate for moving the plate in said horizontal rectilinear movements; and
   fastening means for selectively clamping and unclamping the upper run of said conveyor belt to and from said base so that when the fastening means is clamped the conveyor belt is caused to rotate about the plate in one direction when the plate is driven away from the base and in the opposite direction when the plate is driven toward the base, said conveyor belt being rotated solely by movements of the plate and being stantionery with respect to the plate when the fastening means is unclamped.

2. An apparatus for moving an object according to claim 1, wherein there is provided a frame fixed to and supporting said plate, said driving means being connected to the frame for driving the plate.

3. An apparatus according to claim 2, wherein said frame is fixed to a second horizontal plate positioned below said first plate and a second belt is rotatably mounted about the second plate, both ends of the second belt at the foward edge of the frame in the direction of its movement away from the base being fixed to said base.

4. An apparatus according to claim 1, wherein said fastening means comprises a tube secured across the conveyor belt, a shaft rotatable in said tube, and a hook on the shaft engageable with a cooperating fastener means on the base.

5. An apparatus according to claim 4, wherein said fastening means includes a pair of J-shaped hooks one on each end of said shaft, said cooperating fastener means comprises a pair of upstanding posts on the base, and a crank is provided at one end of the shaft for turning the shaft.

6. An apparatus according to claim 3, wherein said frame comprises side and end walls integrally joined to said first and second plates to define a hollow rectangular structure, transverse slots being provided in the first and second plates to provide passage for the runs of the rotating belts and transverse rollers being journalled in said side walls for mounting the belts.

7. An apparatus according to claim 6, wherein a plurality of said frames each of elongated, hollow, rectangular shape and each including two narrow belts are pivotally mounted on a single base and arranged horizontally side by side, the pivot of each frame being at the rear end of each frame with respect to the direction of movement of the frame away from the base so that the forward end of each frame can move upwardly or downwardly as the frame is advanced.

8. An apparatus according to claim 7, wherein a single horizontal pivot rod passes through aligned openings in both side walls of each of said frames and constitutes the pivot for all of said frames.

* * * * *